P. J. UDELL.
FISHING REEL.
APPLICATION FILED JULY 5, 1913.

1,206,178.

Patented Nov. 28, 1916.
2 SHEETS—SHEET 1.

Witnesses
A. L. Amstutz
W. V. Rifle

Inventor
Perry J. Udell
By
N. S. Amstutz
Attorney.

P. J. UDELL.
FISHING REEL.
APPLICATION FILED JULY 5, 1913.

1,206,178.

Patented Nov. 28, 1916.
2 SHEETS—SHEET 2.

Witnesses
A. L. Amstutz
James R Paquin

Perry J. Udell  Inventor

By N. S. Amstutz

Attorney

UNITED STATES PATENT OFFICE.

PERRY J. UDELL, OF DECATUR, MICHIGAN.

FISHING-REEL.

1,206,178.   Specification of Letters Patent.   Patented Nov. 28, 1916.

Application filed July 5, 1913. Serial No. 777,400.

*To all whom it may concern:*

Be it known that I, PERRY J. UDELL, citizen of the United States, residing at Decatur, in the county of Van Buren and State of Michigan, have invented certain new and useful Improvements in Fishing-Reels, of which the following is a specification.

My invention relates to improvements in fishing reels, and it appertains more especially to the features pointed out in the annexed claims.

The purpose of my invention is to provide a mechanism that is free from the bothersome overrunning when the line is cast. This difficulty is a serious one and strange to say seems to be found in almost all types of reels now in use.

Many fishermen become quite expert in using their thumb to act as a brake on the reel head. Some devices are provided with a spring releasing brake that is intended to control the speed of the reel. With all the expertness and constructive precautions the fact still remains that a reel with heads formed thereon will occasionally overrun in spite of all provision made to prevent it.

With my device I secure this result in the simplest manner possible, by having no portion of the rotating reel member of large diameter. In other words by causing the line itself to present the largest diameter of the reel. With such a combination of parts the speed of unwinding will always be the same as that of the line that is being cast. Such a condition cannot be secured when heads are secured to the reel center because the momentum they will attain is bound to cause them to overrun due to the stored up energy in the weighted heads rotating at rapid speed. The line is kept at about the center of the reel spindle in an automatic manner, through the placing of the first line guide quite near the reel, both it and the reel being fastened to the pole in any suitable manner.

With these ends in view I show such an instance of adaptation as will illustrate the operative features of my device without limiting myself to the specific details shown.

Figure 1:
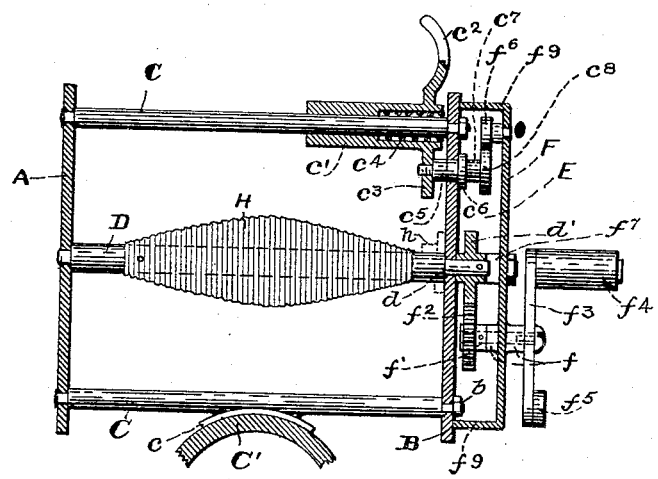
Figure 2:
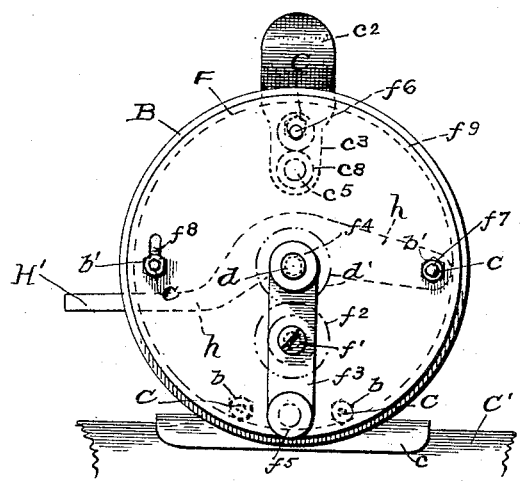
Figure 3:
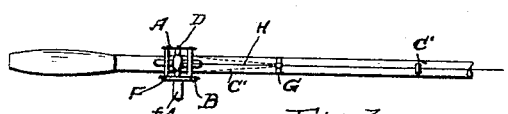
Figure 4:
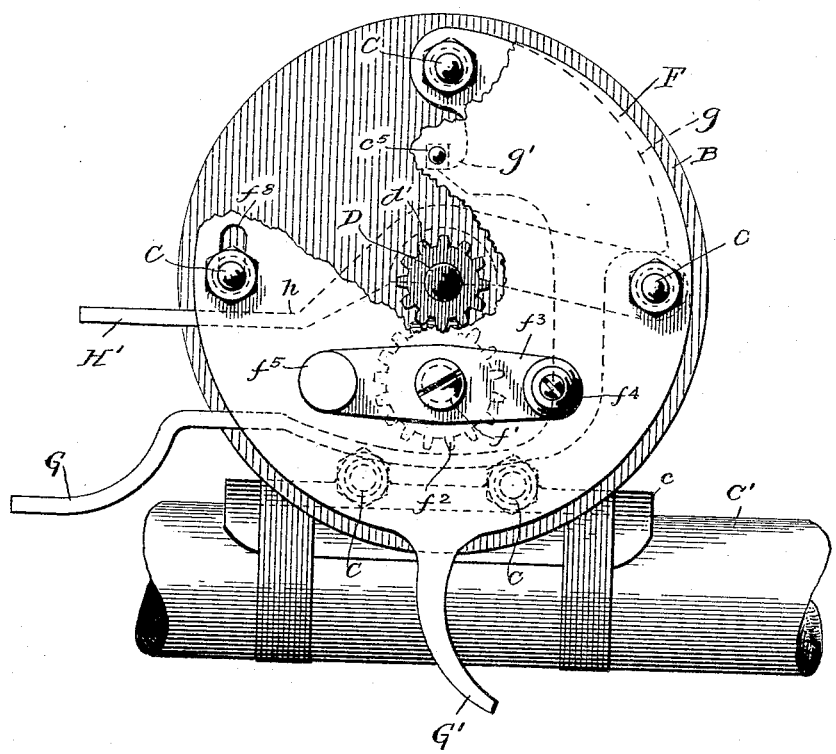

Figure 1 is a side elevation in section. Fig. 2 is an end elevation of Fig. 1. Fig. 3 is a plan showing the relation of the reel to the nearest line guide. Fig. 4 is an elevation of a modified adaptation.

Two stationary heads A and B are placed a suitable distance apart. Both are supported by rods C. These rods are riveted in head A, and head B is secured thereon in a removable manner by means of nuts $b$. The front and rear rods serve to provide a means of support for the gear casing, F. This casing is pivoted on an extension of the rear rod C and the front rod has a similar extension over which a slot, $f^8$, of the casing F fits. Suitable nuts, $b'$, placed on the outside of casing F and abutting shoulders of the extensions serve to retain it in operative relation to the head B.

The reel spindle D is pivoted in heads A and B, its endwise movement being limited by shoulders formed at its ends. The line H is secured to the part lying between heads A and B and a rewinding gear $d'$, is pinned to it, externally of head B, the entire reel is held on the fishing pole C', by a saddle, $c$, secured to the two lower rods C in any suitable manner and the line H is caused to rewind nearly centrally by placing the first line guide G quite close to the reel.

In order that the reel action may be easily controlled I make the following provision therefor: On the topmost rod C, is placed a slidable sleeve, $c'$. This sleeve is recessed at one end to receive the coil spring, $c^4$. It has a thumb extension, $c^2$, and a depending projection, $c^3$, to which a pin, $c^5$, is secured. This pin passes through a hole in the head B, and thus prevents the sleeve $c'$ being moved around the rod C.

The endwise movement of the sleeve $c'$ and pin $c^5$ is defined by shoulder $c^6$ that prevents the spring $c^4$ moving the sleeve and pin farther than head B will permit through the shoulder $c^6$ engaging therewith. The movement in an opposite direction is limited by the sleeve abutting the opposite or inner face of the head B. A suitable radial projection $c^8$ is formed on the outer end of the pin $c^5$ and between it and the limit shoulder $c^6$ a depression or reduction of diameter $c^7$ is formed. When the gear $d'$ is engaged by gear $f^2$ they are kept in mesh so long as the enlarged end of stud $f^6$ rests on $c^8$.

Casing F has protective flanges $f^9$ formed thereon and bosses $f$ below the center thereof serve as a bearing for the short shaft $f'$ to the inner end of which gear $f^2$ is fastened and on its outer end crank $f^3$ is secured. Handle $f^4$ and counter weight $f^5$ are fastened to the crank in any suitable manner.

When the line is to be cast thumb piece $c^2$ is moved to the right against the tension of spring $c^4$ so as to slide $c^3$ from beneath $f^6$ which then allows $f^6$ to drop into recess $c^7$, carrying with it the casing F pivoted at $f^7$. The casing F drops as far as the slot $f^8$ will permit, sufficiently far to disengage gears $d'$ and $f^2$ leaving the reel spindle D free to follow the unwinding of the line H. Suppose the cast is a successful one and the expected fish moves away with the hook, a quick upward push of the index finger of the right hand will raise the casing F far enough to engage gears $d'$ and $f^2$ and allow the spring $c^4$ to automatically push $c^3$ underneath $f^6$ thus holding the gears in mesh and the line under the control of handle $f^4$ as long as desired.

It is of course immaterial whether the sleeve $c'$ be placed on the upper rod C, the front one or one of the lower ones so long as the finger piece $c^2$ is easily accessible. The casing F might also have a depending finger piece G', if desired for the purpose of enabling one to pull the gears into mesh instead of lifting the casing as described. Instead of sleeve C' a gravity catch $g$ might be pivoted on upper rod C, leaving its thumb end G terminating on the inside of head B, near the pole, and having a short catch located beneath its pivotal point to engage a suitable pin $c^5$ projecting inward from casing F. These modified forms shown in Fig. 4 are substantially equivalents of each other and the structure illustrated in Figs. 1–3.

In case a "thumbing" retard or drag is desired it may be placed just inside of the head B as shown by dotted lines $h$ in Fig. 1. The rear end being pivoted on rod C and the front end H' projecting far enough to make it accessible.

The important features of my reel are, simplicity of design, ease of operation, economy of manufacture, and certainty of action, a combination of valuable advantages that it is believed other reels do not possess.

What I claim is—

1. In reels, a suitable support, a line holding spindle rotatable therein, a gear on said spindle, a suitable pivoted casing, a gear shaft and crank secured thereon the same being adapted to engage the spindle gear, and means for retaining such engagement or releasing the same as desired by movement of the casing.

2. In reels, a pair of stationary heads, suitable distance rods for holding the said heads, a free running headless spindle rotatable in the heads, a casing pivoted to one of the heads, and means for raising or lowering the casing whereby interrelated operating means located on said spindle and said casing may be thrown out of or into engagement as desired.

3. In reels, a stationary support, a headless spindle rotatable thereon, a casing pivoted to the support, intermeshing rotative members secured on the said spindle and said head, and means adapted to retain said members in mesh or hold them disengaged as desired.

4. A suitable frame, a line holding spindle rotatable therein, a gear carried by the spindle, a suitable pivoted holder, a shaft projecting therethrough, a thumbing lever, acting thereon, a crank at one end, a gear at the other end adapted to engage the gear on the spindle, means for retaining such engagement or releasing the same as desired, and a finger projecting from the holder for actuating the same.

5. A suitable frame, a headless line holding spindle, a brake lever operable on the spindle, means for confining the rewind to the central portion of the spindle, a pivoted holder plate attached to the frame, a gear on the spindle, a gear, shaft and crank on the holder, and means for moving and holding the gears in engagement, and releasing the same as desired.

6. A suitable frame, a line holding spindle rotatable therein, a gear carried by the spindle, an adjacently pivoted supporting plate, a gear thereon, a projection therefrom extending from said plate, means for automatically holding the gears against disengagement, and means projecting from such holder adapted to release the same to unmesh the gears.

7. A suitable frame, a line holding spindle rotatable therein, a gear carried by the spindle, an intermeshing gear, a pivoted supporting plate therefor, a finger extension projecting from said plate, means for automatically holding the same against disengagement while in action, and suitable means comprising a projecting thumb extension for releasing the support to unmesh the gears.

In testimony whereof I affix my signature in presence of two witnesses.

PERRY J. UDELL.

Witnesses:
J. L. STURR,
THEO. BORST.